(12) United States Patent
Katano et al.

(10) Patent No.: US 11,125,387 B2
(45) Date of Patent: Sep. 21, 2021

(54) HIGH-PRESSURE TANK, HIGH-PRESSURE TANK MOUNTING APPARATUS AND METHOD FOR MANUFACTURING HIGH-PRESSURE TANK

(71) Applicant: TOYOTA JIDOSHA KABUSHIKI KAISHA, Toyota (JP)

(72) Inventors: Koji Katano, Toyota (JP); Masayoshi Takami, Hamamatsu (JP); Motohiro Mizuno, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 93 days.

(21) Appl. No.: 16/432,019

(22) Filed: Jun. 5, 2019

(65) Prior Publication Data

US 2019/0390821 A1 Dec. 26, 2019

(30) Foreign Application Priority Data

Jun. 21, 2018 (JP) .............................. JP2018-117678

(51) Int. Cl.
*F17C 1/06* (2006.01)
*B29C 70/70* (2006.01)
(Continued)

(52) U.S. Cl.
CPC ................ *F17C 1/06* (2013.01); *B29C 70/32* (2013.01); *B29C 70/70* (2013.01);
(Continued)

(58) Field of Classification Search
CPC ................ F17C 1/06; F17C 2203/0621; F17C 2203/0604; F17C 2203/012; F17C 2203/066; F17C 2205/0103; F17C 2209/2154; F17C 2201/0109; F17C 1/16; F17C 2270/0184; F17C 2201/058; F17C 2203/067; F17C 2201/056; F17C 2203/0619; F17C 2203/0665;
(Continued)

(56) References Cited

U.S. PATENT DOCUMENTS 3,815,773 A * 6/1974 Duvall ...................... F17C 1/16
220/590
3,851,786 A * 12/1974 Kaempen ................ B29C 70/00
220/62.19
(Continued)

FOREIGN PATENT DOCUMENTS

JP 2012066674 A 4/2012
JP 2013224856 A 10/2013

*Primary Examiner* — Kareen K Thomas
(74) *Attorney, Agent, or Firm* — Dickinson Wright, PLLC

(57) ABSTRACT

A high-pressure tank comprises a liner, a strengthening layer including a first helical layer and a first hoop layer each including a carbon fiber, and a protective layer including a second helical layer and a second hoop layer each including a glass fiber, in this order. The high-pressure tank is provided with a stress-generating portion, a reinforcement layer includes a first area α overlapping the stress-generating portion in a stacking direction and a second area β that is an area except for the first area, and a one-round portion including a final crossing portion at an end of winding of the glass fiber constituting the second hoop layer overlaps the second area in the stacking direction.

9 Claims, 15 Drawing Sheets

(51) Int. Cl.
*B29C 70/32* (2006.01)
*B29K 307/04* (2006.01)
*B29K 309/08* (2006.01)
*B29K 677/00* (2006.01)
*B29K 63/00* (2006.01)
*B29L 31/00* (2006.01)

(52) U.S. Cl.
CPC ...... *B29K 2063/00* (2013.01); *B29K 2307/04* (2013.01); *B29K 2309/08* (2013.01); *B29K 2677/00* (2013.01); *B29L 2031/7156* (2013.01); *F17C 2201/0109* (2013.01); *F17C 2203/012* (2013.01); *F17C 2203/0604* (2013.01); *F17C 2203/066* (2013.01); *F17C 2203/0621* (2013.01); *F17C 2205/0103* (2013.01); *F17C 2209/2154* (2013.01)

(58) Field of Classification Search
CPC ........ F17C 2221/012; F17C 2223/0123; F17C 2223/036; F17C 2209/221; B29C 70/70; B29C 70/32; B29C 70/86; B29C 70/086; B29K 2307/04; B29K 2309/08; B29K 2677/00; B29K 2063/00; B29L 2031/7156; Y02E 60/32
See application file for complete search history.

(56) References Cited

U.S. PATENT DOCUMENTS

| | | | | |
|---|---|---|---|---|
| 4,579,242 A * | 4/1986 | Ellis, III | ........... | B29C 66/12469 220/4.13 |
| 4,614,279 A * | 9/1986 | Toth | ...................... | B29C 53/602 156/173 |
| 4,785,956 A * | 11/1988 | Kepler | .................. | B29C 53/605 138/30 |
| 5,547,533 A * | 8/1996 | Berglund | ............ | B29C 65/5042 156/175 |
| 8,899,439 B2 * | 12/2014 | Zieger | ....................... | F17C 1/16 220/581 |
| 8,931,661 B2 * | 1/2015 | Kuroiwa | ................ | B29C 70/32 220/660 |
| 2008/0023483 A1 * | 1/2008 | Kanach | .................... | F17C 1/16 220/581 |
| 2009/0071965 A1 * | 3/2009 | Iida | ....................... | B29C 70/086 220/586 |
| 2009/0107570 A1 * | 4/2009 | Weber | ...................... | F17C 1/16 138/30 |
| 2009/0200318 A1 * | 8/2009 | Handa | ....................... | F17C 7/00 220/586 |
| 2009/0200319 A1 * | 8/2009 | Vinjamuri | ............... | F17C 13/06 220/589 |
| 2010/0025411 A1 * | 2/2010 | Otsubo | .................... | F17C 1/14 220/581 |
| 2010/0181213 A1 * | 7/2010 | Fujita | ..................... | F17C 11/005 206/0.7 |
| 2010/0294776 A1 * | 11/2010 | Liu | .................. | B60K 15/03006 220/562 |
| 2012/0012593 A1 * | 1/2012 | Kuroiwa | ................... | F17C 1/16 220/660 |
| 2012/0325832 A1 * | 12/2012 | Takeuchi | ............... | B64G 1/402 220/661 |
| 2013/0049256 A1 * | 2/2013 | Tani | ........................ | B29C 49/20 264/249 |

* cited by examiner

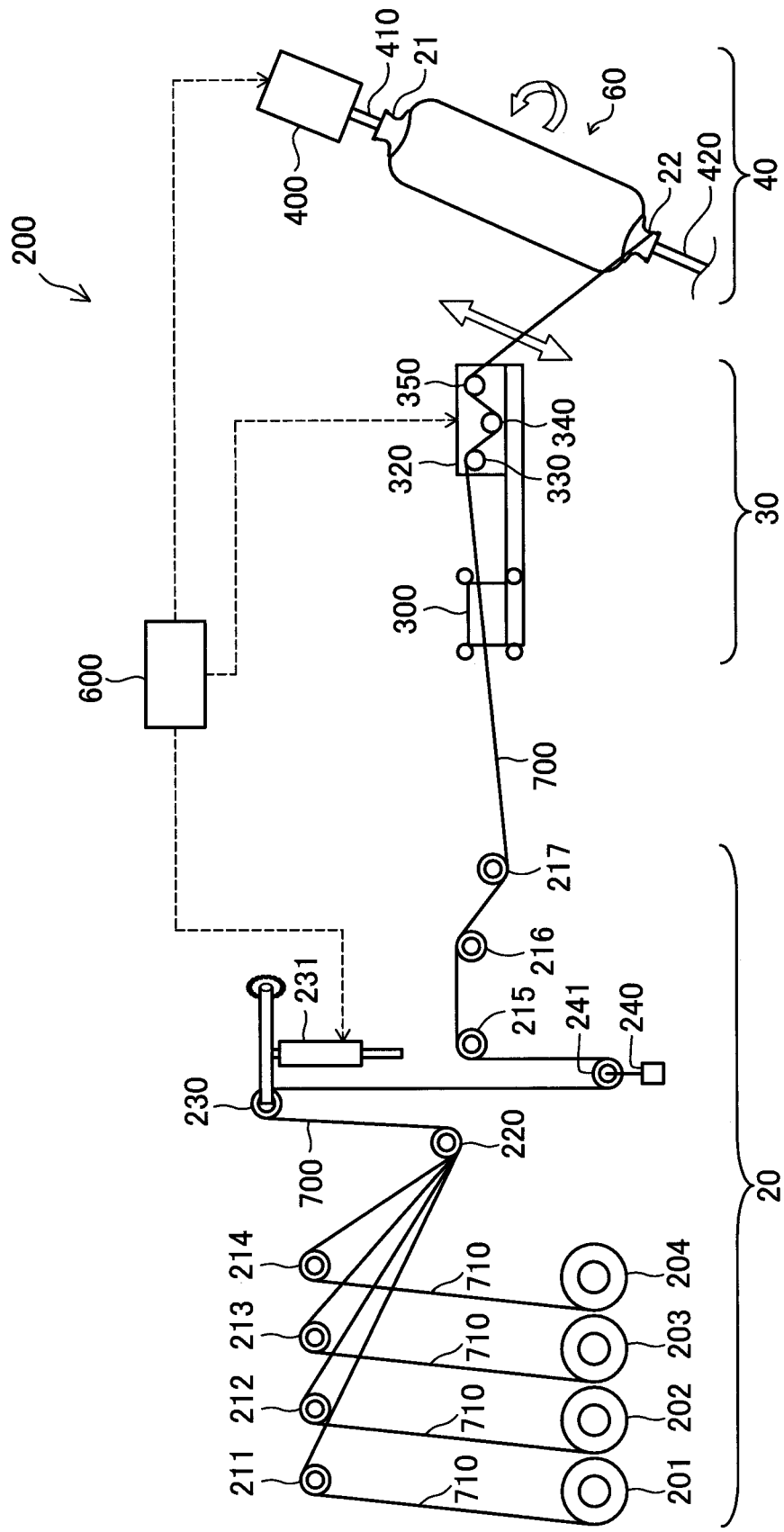

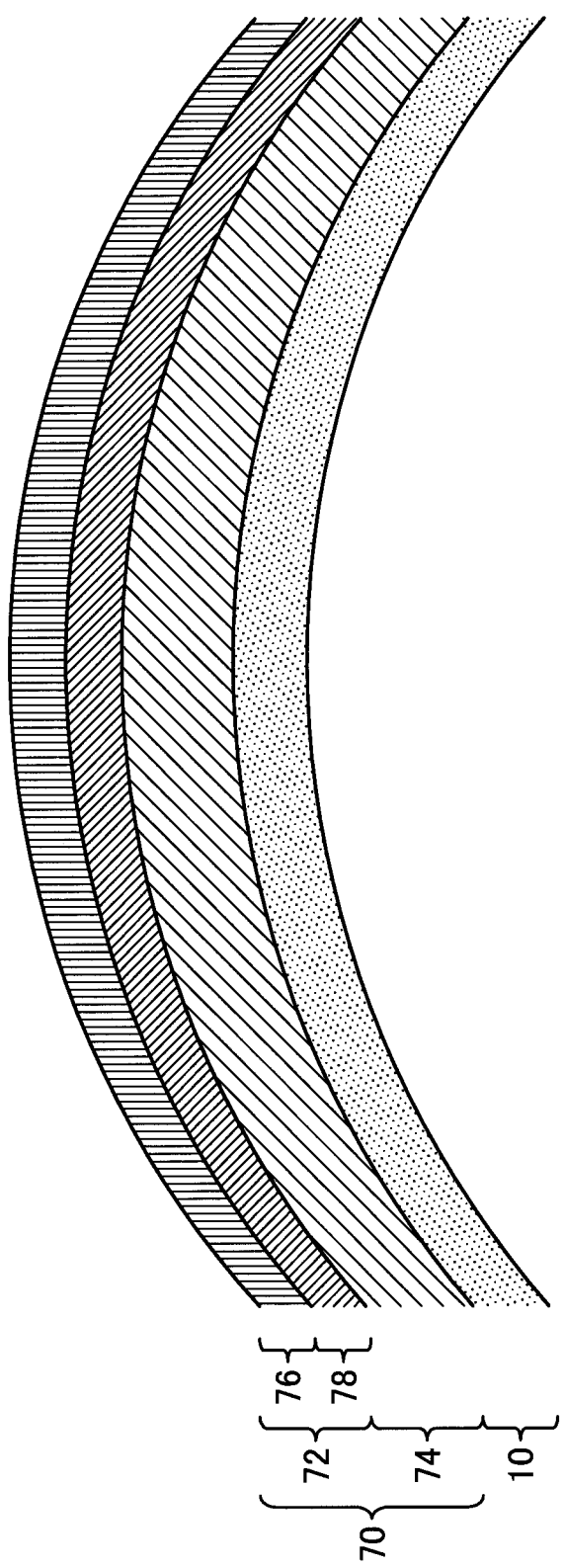

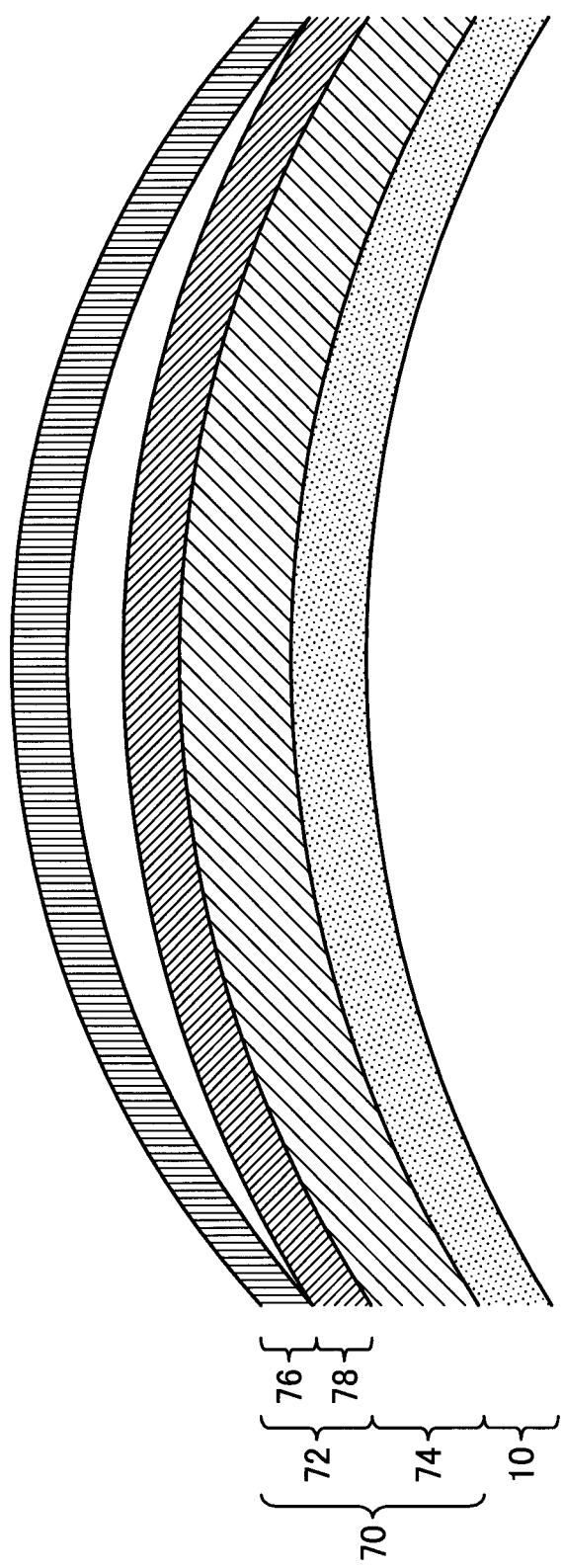

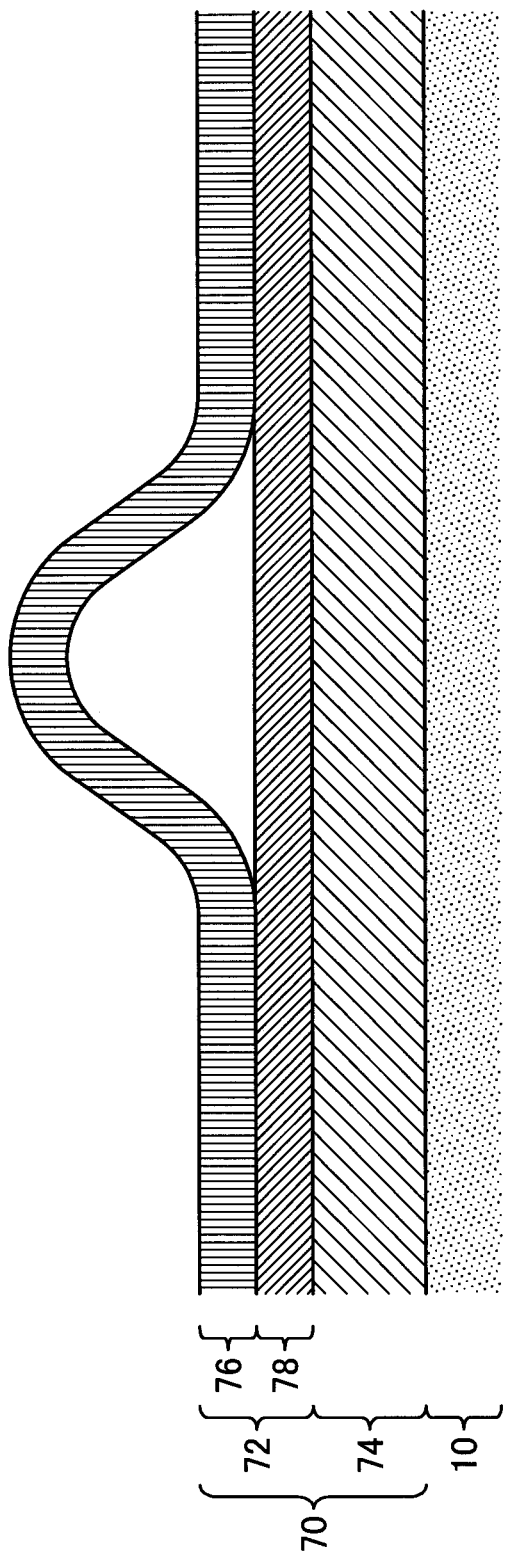

HIGH-PRESSURE TANK, HIGH-PRESSURE TANK MOUNTING APPARATUS AND METHOD FOR MANUFACTURING HIGH-PRESSURE TANK

CROSS REFERENCE TO RELATED APPLICATIONS

The present application claims priority to Japanese Patent Application No. 2018-117678, filed on Jun. 21, 2018, the contents of which are incorporated herein by reference in their entirety.

BACKGROUND

Field

The present disclosure relates to a high-pressure tank, a high-pressure tank mounting apparatus and a method for manufacturing the high-pressure tank.

Related Art

There is a known configuration of a tank for storing and sealing high-pressure fluid that includes a liner forming a space for storing the fluid and a reinforcement layer disposed to cover the liner and including fiber-reinforced plastic (FRP). Specifically, for example, there is a known configuration in which a layer including a carbon fiber reinforced plastic, i.e., CFRP, (CFRP layer) is formed on the liner as the reinforcement layer and a protective layer (GFRP layer) including a glass fiber reinforced plastic, i.e., GFRP, is formed on the CFRP layer. See, for example, Patent Literature 1.

Patent Literature 1: JP 2013-224856A

Inventors of this application have discovered that repetition of an increase and decrease cycle of an inner pressure for such a high-pressure tank sometimes causes a crack in a surface of the protective layer. Therefore, technology to reduce the crack in the surface of the reinforcement layer is desired.

SUMMARY

According to one aspect of the present disclosure, a high-pressure tank is provided. The high-pressure tank comprises a liner including a cylindrical portion and hemispherical dome portions on both sides of the cylindrical portion, and a reinforcement layer covering an outer surface of the liner. The reinforcement layer includes a strengthening layer that is formed on the liner and includes a first helical layer including a carbon fiber in helical winding and a first resin, and a first hoop layer including the carbon fiber in hoop winding and the first resin. The reinforcement layer includes a protective layer that is formed on the strengthening layer and includes a second helical layer including a glass fiber in the helical winding and a second resin, and a second hoop layer formed on the second helical layer and including the glass fiber in hoop winding and the second resin. The high-pressure tank further comprises a stress-generating portion generating a local stress in the reinforcement layer. The stress-generating portion is at least one of (a) a convex portion locally forming a convex shape on the outer surface of the liner, (b) a step portion where the carbon fiber or the glass fiber crosses itself at a transition part where a winding angle of the carbon fiber or the glass fiber changes in the reinforcement layer, (c) a fiber joining portion where ends of the carbon fibers, ends of the glass fibers, or ends of the carbon fiber and the glass fiber are joined together in the reinforcement layer, (d) an end crossing portion where the carbon fiber entwines and crosses the same carbon fiber or the glass fiber entwines and crosses the same glass fiber on at least one of a winding start of the carbon fiber, a winding end of the carbon fiber, and a winding start of the glass fiber, (e) a helical crossing portion where the carbon fiber cross itself in the first helical layer disposed in contact with the liner. The reinforcement layer includes a first area that overlaps the stress-generating portion in a stacking direction of the strengthening layer and the protective layer stacked one on the other and a second area that is an area except for the first area. One-round portion including a final crossing portion where the glass fiber entwines and crosses the same glass fiber at an end of winding of the glass fiber in the second hoop layer overlaps the second area in the stacking direction.

BRIEF DESCRIPTION OF THE DRAWINGS

FIG. 5 is an explanatory diagram illustrating a schematic configuration of a filament winding apparatus.

FIG. 6A is an explanatory diagram illustrating a process in which a crack is caused in a second hoop layer.

FIG. 6B is an explanatory diagram illustrating the process in which the crack is caused in the second hoop layer.

FIG. 6C is an explanatory diagram illustrating the process in which the crack is caused in the second hoop layer.

DETAILED DESCRIPTION

Figure 1:
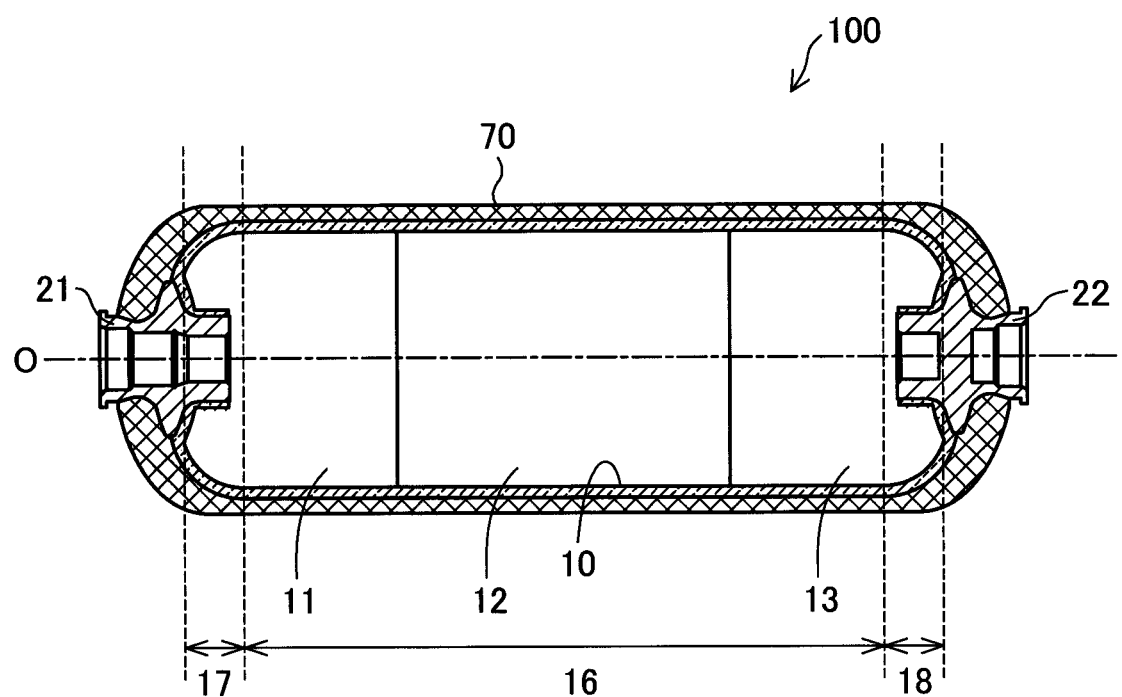
FIG. 1 is a schematic cross-sectional view of a high-pressure tank.

A. First Embodiment (A-1) Overall Configuration of High-Pressure Tank:

FIG. 1 is a schematic cross-sectional view of a high-pressure tank 100 in a first embodiment of the present disclosure. The high-pressure tank 100 stores high-pressure fluid. In the present embodiment, the high-pressure tank 100 stores compressed hydrogen as the fluid and is, for example, installed in a hydrogen tank mounting apparatus such as a fuel cell vehicle. The high-pressure tank 100 includes a liner 10, a reinforcement layer 70, and mouthpieces 21 and 22. FIG. 1 and each of the figures described later schematically illustrates states of components of the high-pressure tank 100 according to the present disclosure, and thus a size of each of the components shown in the figures does not represent a specific size.

The liner 10 includes a space for sealing the fluid in it. The liner 10 includes a cylindrical portion 16 that is formed in a cylindrical shape extending in an axis O direction of the high-pressure tank 100 and two dome portions 17 and 18 in a substantially hemispherical shape, continuing to both ends of the cylindrical portion 16. The liner 10 may be formed of, for example, a synthetic resin such as a nylon-based resin (polyamide-based resin) and a polyethylene-based resin or a metal such as an aluminum alloy. The liner 10 in the present embodiment is formed of nylon. The mouthpieces 21 and 22 are disposed on both ends of the liner 10 at the tops of the dome portions. The mouthpieces 21 and 22 are joined to the liner 10 by insert molding, for example.

In the present embodiment, the liner 10 includes a plurality of components jointed together. Specifically, the liner 10 includes liner components 11, 12 and 13, and these liner components are disposed in the axis O direction in this order. The liner component 11 and the liner component 12, and the liner component 12 and the liner component 13 can be joined together by, for example, infrared welding, laser welding, hot plate welding, vibration welding, ultrasonic welding, or the like. The liner 10 may include a plurality of components other than three components, and may be formed by a different method from joining the plurality of components.

The reinforcement layer 70 is formed to cover an outer surface of the liner 10 so as to reinforce the liner 10 and enhance strength of the high-pressure tank 100, i.e., strength against internal pressure of the tank. The reinforcement layer 70 includes, as its constituent materials, a fiber wound around the outer surface of the liner 10 and a resin impregnated into the fiber.

Figure 2:
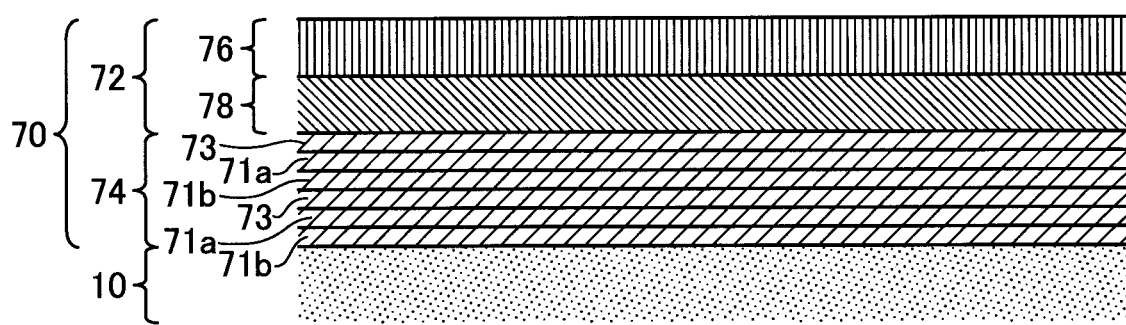
FIG. 2 is a partially enlarged schematic cross-sectional view of an outer wall of the high-pressure tank.

FIG. 2 is a partially enlarged schematic cross-sectional view of an outer wall of the high-pressure tank 100. The reinforcement layer 70 includes a carbon fiber reinforced plastic layer 74 (hereinafter also referred to as a CFRP layer 74) including the carbon fiber reinforced plastic (CFRP) and disposed on the liner 10, and a glass fiber reinforced plastic layer 72 (hereinafter also referred to as a GFRP layer 72) including the glass fiber reinforced plastic (GFRP) and disposed on the CFRP layer. The CFRP layer 74 is also referred to as a strengthening layer. The GFRP layer 72 is also referred to as a protective layer.

The CFRP layer 74, i.e., strengthening layer, includes a layer in which a carbon fiber is wound around by hoop winding (referred to as a first hoop layer 73) and a layer in which a carbon fiber is wound around by helical winding (referred to as a first helical layer 71). See FIG. 7 described later. The "hoop winding" is a way of winding in which a winding angle of a fiber relative to the axis O direction is substantially right angle while the "helical winding" is a way of winding in which a winding angle of a fiber relative to the axis O direction is lower than the winding angle of the hoop winding. The "helical winding" is divided into a "high-angle helical winding" and a "low-angle helical winding". In the high-angle helical winding, the fiber is wound around the axis O at least once, and then a winding direction of the fiber is turned on any one of the dome portions so as to form a relatively high winding angle. In the low-angle helical winding, the winding direction of the fiber is turned on any one of the dome portions before the fiber is completely wound around the axis O so as to form a relatively low winding angle. In the first helical layer 71, a layer in which the carbon fiber is wound around by high-angle helical winding is referred to as a high-angle helical layer 71*a* while a layer in which the carbon fiber is wound around by low-angle helical winding is referred to as a low-angle helical layer 71*b*.

The winding angle of the fiber relative to the axis O direction may be 80° or higher and 90° or lower in the first hoop layer 73, and 70° or higher and 85° or lower in the high-angle helical layer 71*a*, for example. However, the winding angle of the first hoop layer 73 is higher than that of the high-angle helical layer 71*a*. The winding angle of the fiber relative to the axis O direction in the low-angle helical layer 71*b* may be 0° or higher and 40° or lower. Preferably, the winding angle in the low-angle helical layer 71*b* is 5° or higher and 35° or lower.

The CFRP layer 74 includes one or more layers respectively of the first hoop layer 73, the high-angle helical layer 71*a*, and the low-angle helical layer 71*b*, and respective layers are stacked in a predetermined order. FIG. 2 shows the CFRP layer 74 in which the low-angle helical layer 71*b*, the high-angle helical layer 71*a*, the first hoop layer 73, another low-angle helical layer 71*b*, another high-angle helical layer 71*a*, and another first hoop layer 73 are stacked in this order on the liner 10. The stacking order shown in FIG. 2 is an example, and thus the number and the stacking order of respective layers constituting the CFRP layer 74 may vary. The winding angle may be constant in each of the first hoop layer 73, the high-angle helical layer 71*a*, and the low-angle helical layer 71*b*. However, if a plurality of first hoop layers 73, high-angle helical layers 71*a*, or low-angle helical layers 71*b* are disposed, the winding angles in different layers of the same kind may be different.

The CFRP layer 74 includes a transition part where the winding angle of the fiber is changed between the layers. Specifically, for example, the transition parts where the winding angles are drastically changed exist between the low-angle helical layer 71*b* and the first hoop layer 73 and between the low-angle helical layer 71*b* and the high-angle helical layer 71*a*. Accordingly, the transition part where the low-angle helical layer 71*b* changes to a layer having a higher winding angle than that of the low-angle helical layer 71*b* is referred to as a first transition part. As described above, in the transition part where the winding angle of the fiber is changed, the fiber is wound around while the winding angle is variously changed, and at the same time, a winding position of the fiber is moved to a winding start position of the next layer. The first transition part will be described later in detail.

The GFRP layer 72, i.e., protective layer, includes a second helical layer 78 which is formed on the CFRP layer 74 and in which a glass fiber is wound around by helical winding, and a second hoop layer 76 which is formed on the second helical layer 78 and in which the glass fiber is wound around by hoop winding. The winding angle in the second helical layer 78 may be the same as that of the low-angle helical layer 71*b*, for example. The winding angle in the second hoop layer 76 may be the same as that of the first hoop layer 73, for example. There is a transition part where the winding angle is drastically changed between the second helical layer 78 and the second hoop layer 76, like the transition part in the CFRP layer 74. This transition part is also referred to as a second transition part. The second transition part will be described later in detail. In the present embodiment, the second hoop layer 76 constitutes an outer surface of the high-pressure tank 100. However, at least part of a surface of the second hoop layer 76 may be covered with some sort of layer. For example, a layer including a different kind of resin from the one included in the GFRP layer 72 may be formed on the at least part of the surface of the second hoop layer 76.

As the resin included in each of the layers constituting the CFRP layer 74 and the GFRP layer 72, for example, a thermosetting resin such as an epoxy resin or a thermoplastic resin such as a polyester resin and a polyamide resin may be used. The resin included in the CFRP layer 74 is referred to as a first resin, and the resin included in the GFRP layer 72 is referred to as a second resin. In the present embodiment, an epoxy resin is used as the first and second resins. The first and second resins may be of the same kind or different kinds. If the first and second resins are of the same kind, resin properties may be differentiated by including or excluding a curing accelerator and a reinforcing agent. In addition, if the curing accelerator and the reinforcing agent are included, the resin properties may be differentiated by varying kinds and amounts of the curing accelerator and the reinforcing agent.

Figure 3:
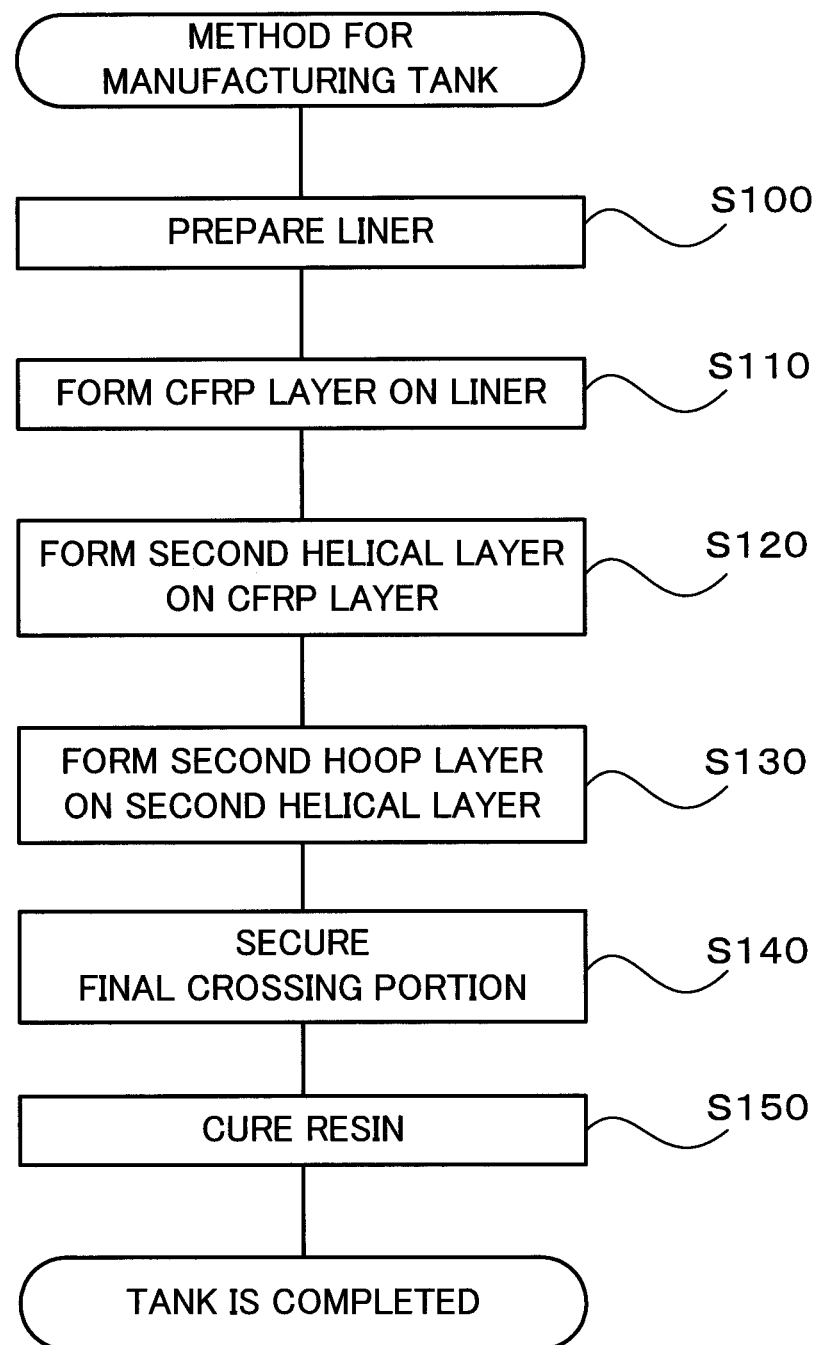
FIG. 3 is a flowchart illustrating an outline of a method for manufacturing the high-pressure tank.

(A-2) Method for Manufacturing High-Pressure Tank:

FIG. 3 is a flowchart illustrating an outline of a method for manufacturing the high-pressure tank 100. In order to produce the high-pressure tank 100, first of all, the liner 10 is prepared (step S100). Then, the CFRP layer 74 is formed with a resin-impregnated carbon fiber on the prepared liner 10 (step S110). Subsequently, the second helical layer 78 is formed with a resin-impregnated glass fiber on the CFRP layer 74 (step S120), and the second hoop layer 76 is formed with the resin-impregnated glass fiber on the second helical layer 78 (step S130). After forming the second hoop layer 76, a final crossing portion disposed at the end of the winding of the resin-impregnated glass fiber is secured on a surface of the GFRP layer 72 (step S140). The final crossing portion will be described later. Then, the resins constituting the CFRP layer 74 and the GFRP layer 72 are cured (step S150) so as to complete the high-pressure tank 100. The resins can be cured by, for example, heating using a heating furnace or induction heating using an induction heating coil that induces high-frequency induction heating.

Figure 4:
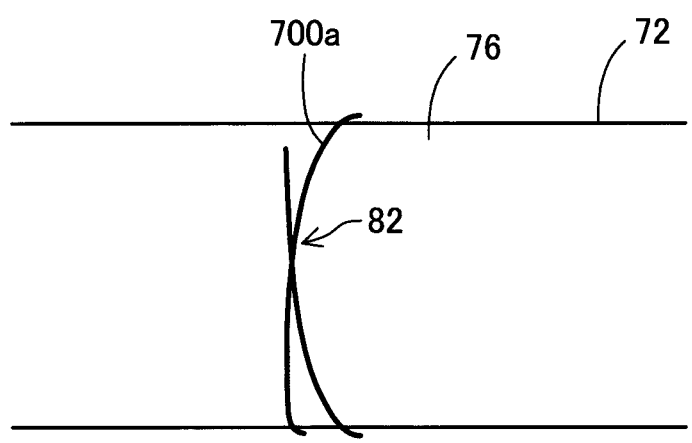
FIG. 4 is an explanatory diagram schematically illustrating a configuration of a final crossing portion.

FIG. 4 is an explanatory diagram schematically illustrating a configuration of the final crossing portion 82. The final crossing portion 82 is a portion where the resin-impregnated glass fiber 700a entwines and crosses the same resin-impregnated glass fiber 700a at the end of the winding of the resin-impregnated glass fiber constituting the second hoop layer 76. The final crossing portion 82 can be formed, for example, by winding around the resin-impregnated glass fiber 700a once along a circumferential direction of the liner 10 and then entwining it with the same glass fiber 700a so as to cross it. Alternatively, the final crossing portion 82 may be formed by entwining the glass fiber 700a with the same glass fiber 700a so as to cross it at a different portion from where the glass fiber 700a is wound around once along the circumferential direction. Securing of the final crossing portion 82 on the surface of the GFRP layer 72 can be implemented by curing the resin included in the final crossing portion 82 on the surface of the GFRP layer 72. The securing of the final crossing portion 82 may be performed at the same time as the whole reinforcement layer 70 is cured, or prior to it.

FIG. 5 is an explanatory diagram illustrating a schematic configuration of a filament winding apparatus 200 in the present embodiment. The apparatus is also referred to as an "FW apparatus" hereinafter. The CFRP layer 74 and the GFRP layer 72 are formed by a filament winding method using the same kind of FW apparatus 200. The filament winding method is a method including winding a fiber impregnated with a thermosetting resin around a mandrel, i.e., the liner 10 in the present embodiment, and heating the thermosetting resin to cure it.

The FW apparatus 200 includes a fiber unwinding unit 20, a fiber bundle guiding unit 30, a winding unit 40, and a controller 600. In FIG. 5, a workpiece of the FW apparatus 200, that is, the liner 10 provided with the mouthpieces 21 and 22, or an unfinished tank in which a fiber is partially wound around the liner 10, is referred to as a work 60.

The fiber unwinding unit 20 has a function to wind off a fiber bundle 700 and includes a plurality of bobbins 201 to 204, a plurality of conveyance rollers 211 to 217, a bundling roller 220, a tension roller 230, and an active dancer roller 240.

Each of the plurality of bobbins 201 to 204 is cylindrical, and a tow prepreg 710 is wound around it. The tow prepreg 710 is a fiber including about 20,000 to 50,000 filaments and impregnated with the resin described above. The tow prepreg 710 is the resin-impregnated carbon fiber when the CFRP layer 74 is formed, and the resin-impregnated glass fiber when the GFRP layer 72 is formed. In the following description, the tow prepreg forming the CFRP layer 74 may be simply referred to as the carbon fiber, and the tow prepreg forming the GFRP layer 72 may be simply referred to as the glass fiber. Some of the plurality of conveyance rollers 211 to 214 are disposed to correspond to the plurality of bobbins 201 to 204, respectively, and convey the tow prepregs 710 that are wound off from the plurality of bobbins 201 to 204 to the bundling roller 220. The bundling roller 220 aligns the tow prepregs 710 wound off from the plurality of bobbins 201 to 204 so as to make them into the fiber bundle 700 and wind it off to the tension roller 230. The tension roller 230 includes a cylinder 231 set at a predetermined pressure to apply a tensile force to the fiber bundle 700. The active dancer roller 240 moves a roller 241 so as to adjust the tensile force of the fiber bundle 700. The tensile force when the fiber bundle 700 is wound around the work 60 can be changed by the pressure set to the cylinder 231. The fiber bundle 700 with the adjusted tensile force is conveyed to the fiber bundle guiding unit 30 via the rest of the plurality of conveyance rollers 215 to 217.

The fiber bundle guiding unit 30 aligns the fiber bundle 700 and guides it to the work 60. The fiber bundle guiding unit 30 can move along a longitudinal direction of the work 60 as indicated by an outlined arrow so as to change its relative position to the work 60. By changing the relative position of the fiber bundle guiding unit 30 to the work 60, a winding angle of the fiber bundle 700 when the fiber bundle 700 is wound around the work 60 can be adjusted.

The fiber bundle guiding unit 30 includes an alignment opening 300 and a fiber feed section 320. The alignment opening 300 gathers the fiber bundle 700 and align it in a width direction, i.e., a front-to-back direction of the figure. The fiber feed section 320 includes a first convergence roller 330, a second convergence roller 340, and a third convergence roller 350, and uses these three convergence rollers 330, 340 and 350 to convey the fiber bundle 700 to the work 60. In the present embodiment, the fiber bundle 700 is guided to the work 60 such that it enters from a side of the first convergence roller 330 and comes into contact with an upper circumference of the first convergence roller 330, a lower circumference of the second convergence roller 340, and an upper circumference of the third convergence roller 350. The fiber bundle 700 coming out of the fiber bundle guiding unit 30 becomes a belt shape of approximately 5 to 20 mm in width and 0.2 to 0.8 mm in thickness, for example.

The winding unit 40 rotates the work 60 so as to wind the fiber bundle 700 around the work 60. The winding unit 40 includes a rotation device 400, a rotary shaft 410, and a support shaft 420. The work 60 is installed in the winding unit 40 such that the rotary shaft 410 and the support shaft 420 overlap the axis O. One end of the rotary shaft 410 is secured to the rotation device 400 while the other end is secured to the mouthpiece 21 of the work 60. One end of the support shaft 420 supports the work 60 via the mouthpiece 22 in a rotatable manner. When the rotation device 400 is actuated, the rotary shaft 410 starts rotating so as to rotate the work 60, whereby the fiber bundle 700 is wound around the work 60.

The controller 600 controls winding operation of the fiber bundle 700 around the work 60 by the FW apparatus 200. That is, the controller 600 controls operation of the fiber unwinding unit 20, the fiber bundle guiding unit 30 and the winding unit 40. Specifically, the controller 600 can control, for example, the tensile force applied by the cylinder 231, move of the fiber feed section 320, and rotational speed of the rotation device 400. As a result, the controller can control the tensile force applied to the fiber wound around the work 60, the winding angle of the fiber relative to the work 60, the rotational speed of the work 60, and the like. By this control, the fiber bundle 700 can be wound around the surface of the work 60 by appropriately combining the hoop winding, the high-angle helical winding, or the low-angle helical winding.

(A-3) Cracking in Second Hoop Layer:

In the high-pressure tank 100 in the present embodiment, a crack may occur in the surface of the second hoop layer 76 that is an outmost layer. Occurrence of the crack in the second hoop layer 76 is described hereinafter.

FIGS. 6A to 6C are explanatory diagrams illustrating a process in which the crack occurs in the second hoop layer 76 and are partially enlarged schematic cross-sectional views of an outer wall of the high-pressure tank 100. FIG. 6A shows a state when the high-pressure tank 100 is filled with hydrogen. If the high-pressure tank 100 is filled with hydrogen, the liner 10 expands. As a result, the entire outer wall of the high-pressure tank 100 including the liner 10 and the reinforcement layer 70 curves toward the outside of the tank.

FIG. 6B shows a state when an amount of compressed hydrogen stored in the high-pressure tank 100 has decreased compared with the state in FIG. 6A. If the amount of the compressed hydrogen stored in the high-pressure tank 100 decreases, an expanding degree of the liner 10 decreases. As a result, a curvature degree of the reinforcement layer 70 also decreases along with the liner 10. Since the second hoop layer 76 is the outmost layer in the reinforcement layer 70, it is most vulnerable to shock or heat from the outside. Accordingly, the resin constituting the second hoop layer 76, in particular, deteriorates faster than the other resins in the reinforcement layer 70. If the deterioration of the resin constituting the second hoop layer 76 progresses, the resin constituting the second hoop layer 76 becomes brittle, which reduces flexibility and toughness of the second hoop layer 76. In such a case, if the amount of the compressed hydrogen stored in the high-pressure tank 100 decreases, the second hoop layer 76 cannot follow transformation of the other layers, and then the second hoop layer 76 and the second helical layer 78 may separate from each other, as shown in FIG. 6B.

FIG. 6C shows a state when the amount of the compressed hydrogen stored in the high-pressure tank 100 has further decreased compared with the state in FIG. 6B. When the resin constituting the second hoop layer 76 deteriorates and the second hoop layer 76 peels off from the second helical layer 78, and the expanding degree of the liner 10 further decreases, the second hoop layer 76 may buckle as shown in FIG. 6C. If the second hoop layer 76 buckles, the crack is likely to occur at the buckling portion in the second hoop layer 76. If the crack occurs in the second hoop layer 76, it becomes visible from the outside of the high-pressure tank 100. The crack may easily occur due to environment depending on the second resin used for the GFRP layer 72.

(A-4) Suppression of Cracking in Second Hoop Layer:

One of the reasons of cracking in the second hoop layer 76 is that the second hoop layer 76 peels off from the second helical layer 78, as described above. There are multiple portions where the peeling of the second hoop layer 76 is likely to occur in the high-pressure tank 100. One of the portions where the peeling of the second hoop layer 76 is likely to occur, i.e., where resistance to the buckling is relatively low, is a one-round portion including the final crossing portion 82 disposed at the end of the winding of the glass fiber wound around in the circumferential direction of the high-pressure tank 100 to constitute the second hoop layer 76. This portion is also referred to as a terminal portion hereinafter. The tensile force of the winding fiber is easily released especially at the terminal portion of the glass fiber. As a result, the second hoop layer 76 is likely to peel off and then, buckle or crack at the terminal portion.

In the present embodiment, as will be described below, the terminal portion of the glass fiber, where the second hoop layer 76 is likely to peel off, and another portion where the peeling of the second hoop layer 76 is likely to occur are disposed so as not to overlap each other in a stacking direction of the respective layers constituting the reinforcement layer 70 (hereinafter simply referred to as a stacking direction). Accordingly, the portions where the second hoop layer 76 is likely to peel off are arranged so as not to overlap each other in the stacking direction, thereby suppressing the peeling of and the crack in the second hoop layer 76.

The other portion where the second hoop layer 76 is likely to peel off is where a local stress is generated in the reinforcement layer 70. The other portion can be also where deformation is relatively high. The high-pressure tank 100 in the present embodiment has a stress-generating portion where the local stress as described above is generated in the reinforcement layer 70. The stress-generating portion is at least one of (a) a convex portion locally forming a convex shape on the outer surface of the liner 10, (b) a step portion where the carbon fiber or the glass fiber cross itself at the transition part where the winding angle of the carbon fiber or the glass fiber changes in the reinforcement layer 70, (c) a fiber joining portion where ends of the carbon fibers, ends of the glass fibers, or ends of the carbon fiber and the glass fiber are joined together in the reinforcement layer 70, (d) an end crossing portion where the carbon fiber entwines and crosses the same carbon fiber or the glass fiber entwines and crosses the same glass fiber on at least one of a winding start of the carbon fiber, a winding end of the carbon fiber, and a winding start of the glass fiber, and (e) a helical crossing portion where the carbon fiber crosses itself in the first helical layer 71 disposed in contact with the liner 10.

Figure 7:
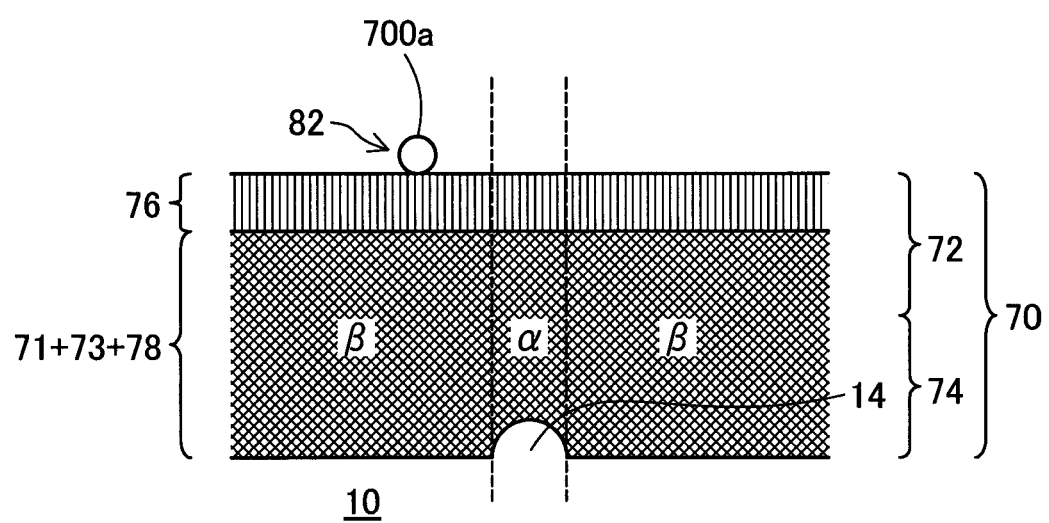
FIG. 7 is a schematic cross-sectional view of an example of a positional relation between a terminal portion and a stress-generating portion.

FIG. 7 is a schematic cross-sectional view of an example of a positional relation between the terminal portion of the glass fiber 700a and the stress-generating portion. FIG. 7 shows an enlarged partial cross-sectional view of the outer wall taken along the axis O of the high-pressure tank 100. In FIG. 7, the one-round portion including the final crossing portion 82 of the glass fiber wound around in the circumferential direction of the high-pressure tank 100 to constitute the second hoop layer 76, i.e., the terminal portion, is shown as a cross section of the glass fiber 700a. In FIG. 7, the stress-generating portion is shown as the convex portion 14 locally forming a convex shape on the outer surface of the liner 10. An area overlapping the convex portion 14 as the stress-generating portion in the stacking direction of the reinforcement layer 70 is shown as a first area α. In the first area α, a local stress is generated by the convex portion 14, and thus the first area α corresponds to the "other portion where the second hoop layer 76 is likely to peel off". An area except for the first area α in the reinforcement layer 70 is shown as a second area β. FIG. 7 shows the terminal portion of the glass fiber disposed to overlap the second area β in the stacking direction.

Figure 8:
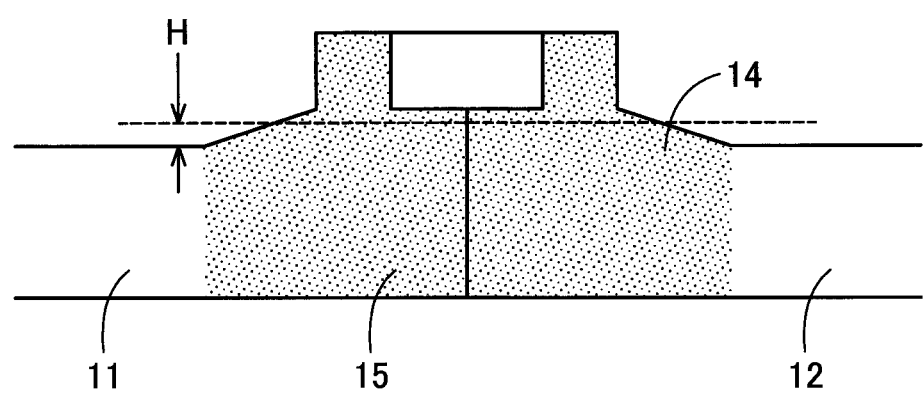
FIG. 8 is an explanatory diagram illustrating an example of a convex portion formed on an outer surface of a liner.

FIG. 8 is an explanatory diagram illustrating an example of the convex portion 14 formed on the outer surface of a liner 10. FIG. 8 is an enlarged schematic cross-sectional view of part of the outer wall of the liner 10 taken along the axis O of the high-pressure tank 100. FIG. 8 shows a liner joining portion 15 joining a liner component 11 and another liner component 12. When the liner components are joined together, a convex structure is usually formed at the liner joining portion 15 between the adjoining liner components. Although such a convex structure can be cut off after joining the liner components, it needs processing with extremely high precision to completely cut off the convex structure, which may be difficult to adopt. If a cutting amount is too large, the liner 10 gets thin, which is not appropriate. Accordingly, as a result of the cutting to avoid the excessive cutting amount, the convex portion 14 usually remains after the cutting the convex structure. FIG. 8 shows a cutting line of the convex structure in a broken line and indicates that the convex portion 14 of height H is formed.

In the present embodiment, as shown in FIG. 7, the terminal portion of the glass fiber is disposed so as not to overlap the convex portion 14 in the stacking direction. Due to the formation of the convex portion 14 on the outer surface of the liner 10, a local stress is generated in the first area α of the reinforcement layer 70. Accordingly, as the high-pressure tank 100 expands or contracts due to filling or discharging of hydrogen, deforming degree of the reinforcement layer 70 is likely to be larger at the portion where the stress is locally generated. As a result, the peeling or the buckling of the second hoop layer 76 is likely to occur. The terminal portion is disposed to overlap the second area β in the stacking direction, thereby suppressing the peeling of the second hoop layer 76 and the like.

Figure 9:
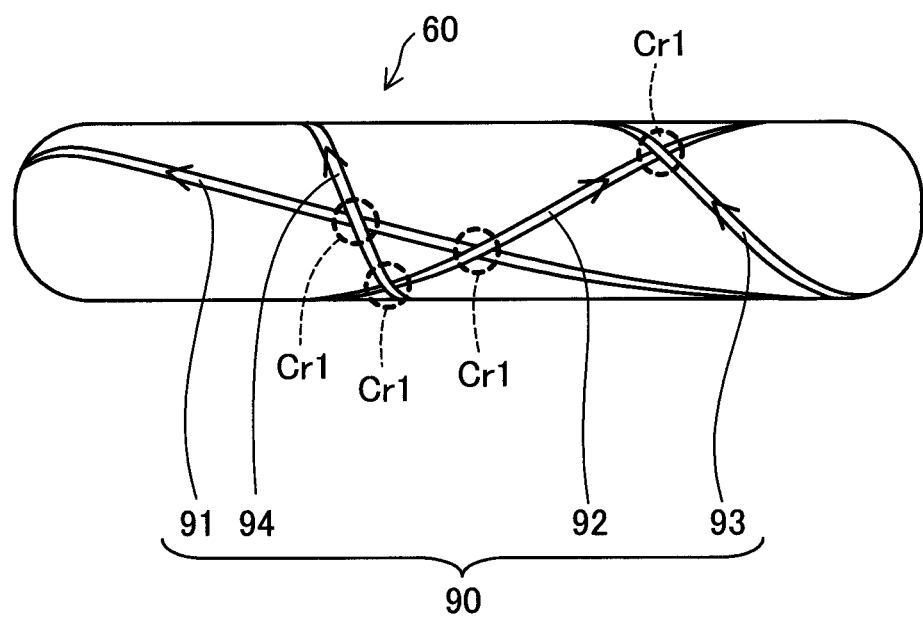
FIG. 9 is an explanatory diagram illustrating another example of the stress-generating portion.

FIG. 9 is an explanatory diagram illustrating another example of the stress-generating portion. FIG. 9 is a diagram illustrating an external appearance of the work 60 in the middle of manufacturing the high-pressure tank 100.

FIG. 9 shows the first transition part 90 disposed in the CFRP layer 74. The first transition part 90 is where the low-angle helical layer 71b changes to the layer having a higher winding angle than that of the low-angle helical layer 71b, as described above. Although the carbon fiber is wound around at approximately constant winding angle in the first helical layer 71 and the first hoop layer 73 constituting the CFRP layer 74, the winding angle drastically changes in the first transition part 90. In FIG. 9, winding paths of the carbon fiber constituting the first transition part 90 are shown by winding paths 91 to 94. As shown in FIG. 9, the carbon fiber is wound around by variously changing the winding angle, and thus one or more crossing portions where the winding carbon fiber crosses the same carbon fiber are created in the first transition part 90. Accordingly, the crossing portion of the carbon fiber causes a difference in level on the work 60. The crossing portion of the carbon fiber in the first transition part 90 is therefore shown as a step portion Cr1 in FIG. 9. The step portion Cr1 generates a local stress in the reinforcement layer 70, and thus the step portion Cr1 in the first transition part 90 could be the stress-generating portion like the convex portion 14 of the liner 10 described above. The step portion Cr1 in the first transition part 90 is also referred to as a first step portion.

Similarly to the first transition part 90 shown in FIG. 9, a step portion similar to the first step portion is formed in the second transition part formed between the second helical layer 78 and the second hoop layer 76, described above, and it could be the stress-generating portion. Regarding the second transition part, terms "the low-angle helical layer 71b", "the layer having a higher winding angle than that of the low-angle helical layer 71b", and "the first transition part 90" in the foregoing description based on FIG. 9 may be respectively replaced with terms "the second helical layer 78", "the second hoop layer 76", and "the second transition part". The step portion Cr1 formed in the second transition part is also referred to as a second step portion.

Figure 10:
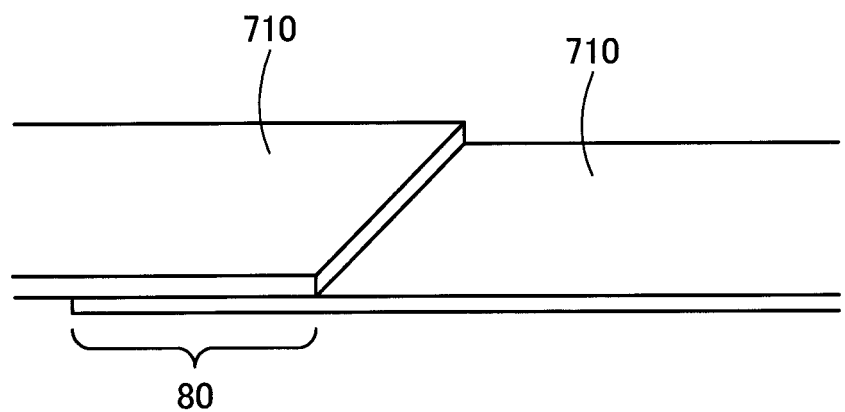
FIG. 10 is an explanatory diagram illustrating another example of the stress-generating portion.

FIG. 10 is an explanatory diagram illustrating another example of the step portion as the stress-generating portion. When the high-pressure tank 100 is produced, the carbon fiber or the glass fiber, i.e., the tow prepreg 710, for example, may be cut while being wound around the work 60. Or, the tow prepregs 710 wound around the bobbins 201 to 204 may run out while being wound around the work 60. See FIG. 5. In such cases, a new fiber is joined so as to continue to produce the high-pressure tank 100. FIG. 10 is a schematic perspective view of the fiber joining portion 80 formed by joining ends of the tow prepregs 710. The tow prepregs 710 can be joined together by heat welding, for example. The fiber joining portion 80 where the carbon fibers are joined together in the CFRP layer 74 is also referred to as a first joining portion, while the fiber joining portion 80 where the glass fibers are joined together in the GFRP layer 72 is also referred to as a second joining portion.

According to the foregoing description, the fiber joining portion 80 in FIG. 10 is the fiber joining portion between the carbon fibers or between the glass fibers; however, it may be a different configuration. For example, it is possible to adopt a configuration in which, between the CFRP layer 74 and the second helical layer 78 in the GFRP layer 72, a terminal end of the carbon fiber constituting the CFRP layer 74 and a stating end of the glass fiber constituting the second helical layer 78 are joined together. In such a case, the fiber joining portion 80 in FIG. 10 may be the portion where the terminal end of the carbon fiber and the starting end of the glass fiber are joined together. The portion where the terminal end of the carbon fiber and the starting end of the glass fiber are joined together is also referred to as a third joining portion. These first joining portion, second joining portion and the third joining portion cause a difference in level on the surface of the work 60. Therefore, each of the fiber joining portions described above could be the stress-generating portion like the convex portion 14 of the liner 10.

Figure 11:
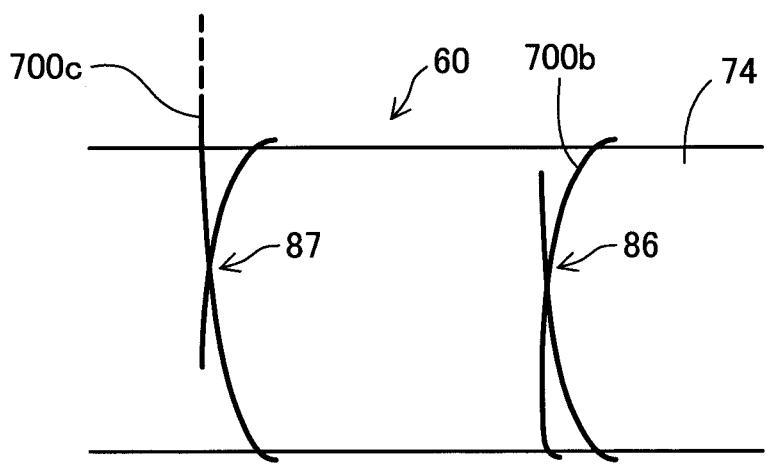
FIG. 11 is an explanatory diagram illustrating another example of the stress-generating portion.

FIG. 11 is an explanatory diagram illustrating still another example of the stress-generating portion. FIG. 11 shows an external appearance of the work 60 in the middle of manufacturing the high-pressure tank 100. FIG. 11 shows a state in which, between the CFRP layer 74 and the second helical layer 78, the terminal end of the carbon fiber constituting the CFRP layer 74 and the stating end of the glass fiber constituting the second helical layer 78 are in Non-connected state. Specifically, FIG. 11 shows a state in which an end crossing portion 86 is formed at a winding end of the carbon fiber and an end crossing portion 86 is formed at a winding start of the glass fiber on the surface of the CFRP layer 74 that has been formed. The end crossing portion 86 is a portion where the carbon fiber 700*b* entwines and crosses the same carbon fiber 700*b* at a winding end of the CFRP layer 74. In addition, the end crossing portion 87 is a portion where the glass fiber 700*c* entwines and crosses the same glass fiber 700*c* at the winding start of the second helical layer 78.

The end crossing portion 86 or the end crossing portion 87 can be formed, for example, by winding the carbon fiber 700*b* or the glass fiber 700*c* around the work 60 once along its circumferential direction and then making the carbon fiber 700*b* or the glass fiber 700*c* entwine and cross the same carbon fiber 700*b* or the same glass fiber 700*c*. Alternatively, the end crossing portion 86 or the end crossing portion 87 may be formed by making the carbon fiber 700*b* or the glass fiber 700*c* entwine and cross the same carbon fiber 700*b* or the same glass fiber 700*c* at a portion different from where the carbon fiber 700*b* or the glass fiber 700*c* is wound around once along the circumferential direction. If the tow prepregs are used as the carbon fiber 700*b* and the glass fiber 700*c*, the end crossing portion 86 and the end crossing portion 87 can be secured to the work 60 by melting the resins impregnated into the tow prepregs by heating. The end crossing portion 86 and the end crossing portion 87 cause a difference in level on the surface of the work 60. Therefore, each of the end crossing portions described above could be the stress-generating portion like the convex portion 14 of the liner 10.

An end crossing portion similar to the end crossing portion 87 shown in FIG. 11 may be formed at an end of the winding start of the carbon fiber constituting the CFRP layer 74 formed on the liner 10. Accordingly, the end crossing portion disposed at the starting end of the carbon fiber constituting the CFRP layer 74 on the outer surface of the liner 10 causes a difference in level on the outer surface of the liner 10, which generates a local stress in the reinforcement layer 70. Therefore, such an end crossing portion could be the stress-generating portion like the convex portion 14 of the liner 10.

Figure 12:
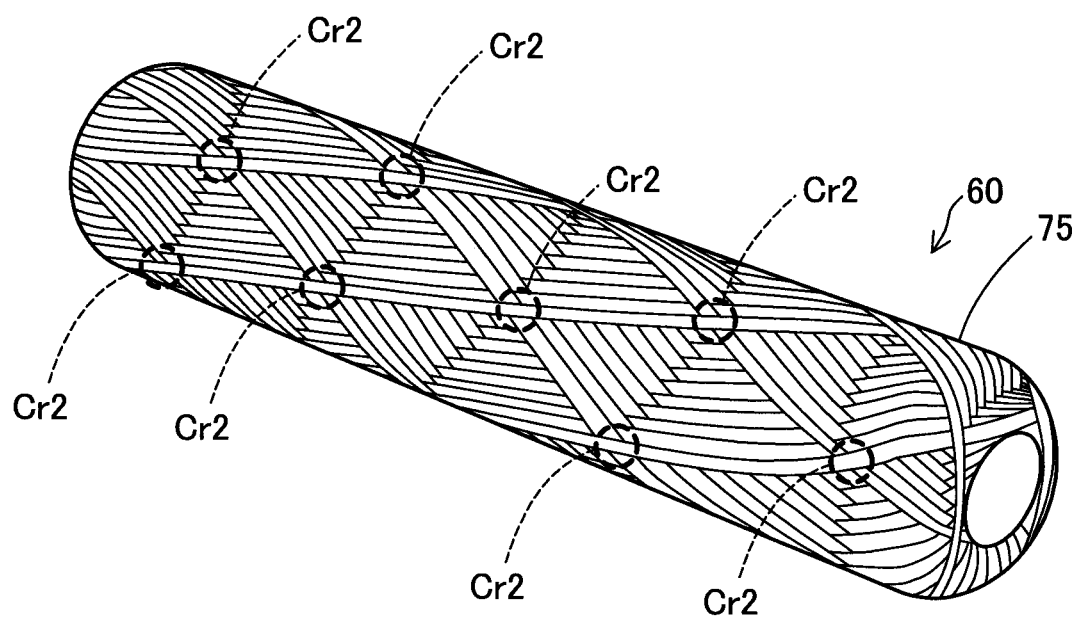
FIG. 12 is an explanatory diagram illustrating another example of the stress-generating portion.

FIG. 12 is an explanatory diagram illustrating still another example of the stress-generating portion which is "the helical crossing portion where the carbon fiber crosses itself in the first helical layer disposed in contact with the liner". FIG. 12 is a perspective view of the external appearance of the work 60 in the middle of manufacturing the high-pressure tank 100. In the present embodiment, as shown in FIG. 2, the low-angle helical layer 71*b* is formed as the layer that is right above the liner 10 and in contact with the liner 10. The low-angle helical layer 71*b* that is formed as the layer right above the liner 10 out of the low-angle helical layers 71*b* is also referred to as an inmost low-angle helical layer 75. FIG. 12 shows a state in which the inmost low-angle helical layer 75 is formed on the liner 10. In the inmost low-angle helical layer 75, there is formed a helical crossing portion Cr2 where the carbon fiber wound by low-angle helical winding crosses itself. In the inmost low-angle helical layer 75, the carbon fiber is wound around with a particular winding pattern showing a constant winding angle. A helical crossing portion Cr2 is where the number of carbon fibers overlapping in the stacking direction is the largest in the inmost low-angle helical layer 75.

The inmost low-angle helical layer 75 includes one or more helical crossing portions Cr2 and it usually includes a plurality of helical crossing portions Cr2 in accordance with a winding angle and a size of the liner 10. Since the carbon fiber is wound around at the constant winding angle in the low-angle helical layer, a degree of the difference in level caused by the helical crossing portion Cr2 is lower than that of the step portion Cr1 including the first step portion and the second step portion shown in FIG. 9. However, rigidity of a material constituting the liner 10 such as a resin is usually higher than that of the resin included in the CFRP layer 74 and the GFRP layer 72. As a result, the helical crossing portion Cr2 in the inmost low-angle helical layer 75 formed right above the liner 10 locally generates larger stress in the reinforcement layer 70, unlike the portions where the carbon fiber or the glass fiber crosses itself in another low-angle helical layer, i.e., the low-angle helical layer 71*b* other than the low-angle inmost helical layer 75 and the second helical layer 78. Therefore, the helical crossing portion Cr2 could be the stress-generating portion like the convex portion 14 of the liner 10.

The layer that is right above the liner 10 and in contact with the liner 10 may be the high-angle helical layer 71*a* instead of the low-angle helical layer 71*b*. However, the degree of the difference in levels formed on the surface of the helical layer due to the helical crossing portion is usually higher in the low-angle helical layer 71*b* than in the high-angle helical layer 71*a*. Therefore, the stress generated in the reinforcement layer 70 is larger in the case of disposing the low-angle helical layer 71*b* as the layer right above the liner 10 than in the case of disposing the high-angle helical layer 71*a*.

As described above, when the terminal portion of the glass fiber is disposed to overlap the second area β in the stacking direction, a location of the stress-generating portion needs to be specified and locations of the first area α and the second area β defined by the location of the stress-generating portion need to be specified, for example. When the stress-generating portion is the first step portion in the CFRP layer 74 described as the step portion Cr1 in FIG. 9 or the helical crossing portion Cr2 in the inmost low-angle helical layer 75 shown in FIG. 12, locations of the first step portion and the helical crossing portion Cr2 can be specified using first winding conditions in procedures for forming the CFRP layer 74. The first winding conditions include the rotational speed of the liner 10, the winding angle of the carbon fiber with respect to the liner 10, and the tensile force applied to the carbon fiber to be wound around the liner 10.

Furthermore, when the stress-generating portion is the second step portion between the second helical layer 78 and the second hoop layer 76 described as the step portion Cr1 in FIG. 9, a location of the second step portion can be specified using second winding conditions at least in procedures for forming the second helical layer 78 and procedures for forming the second transition part where the second helical layer 78 changes to the second hoop layer 76. The second winding conditions include the rotational speed of the liner 10, the winding angle of the glass fiber with respect to the liner 10, and the tensile force applied to the glass fiber to be wound around the liner 10. As described above, the controller 600 controls the tensile force applied by the cylinder 231, the conveyance by the fiber feed section 320, and the rotational speed of the rotation device 400 so as to control the tensile force of the fiber to be wound around the work 60, the winding angle of the fiber with respect to the work 60, the rotational speed of the work 60, and the like. Therefore, the location of each stress-generating portion can be specified using a control history of the controller 600.

When the stress-generating portion is the convex portion 14 disposed on the liner 10, as described above, the location of the stress-generating portion needs to be specified in advance when the liner 10 is installed in the FW apparatus 200. When the stress-generating portion is the first joining portion joining the carbon fibers or the second joining portion joining the glass fibers, as described above, a relative location of the stress-generating portion in the work 60 needs to be specified when the fibers are joined together. When the stress-generating portion is the third joining portion joining the carbon fiber and the glass fiber, a portion of the winding end of the carbon fiber, or a portion of the winding start of the glass fiber between the CFRP layer 74 and the second helical layer 78, as described above, a relative location of the fiber joining portion 80 in the work 60 needs to be specified when such a stress-generating portion is formed.

According to the high-pressure tank 100 in the present embodiment, configured as described above, and the method for manufacturing the high-pressure tank 100, the one-round portion including the final crossing portion 82 at the end of the winding of the glass fiber constituting the second hoop layer 76 is disposed to overlap the second area β, defined by at least one of the stress-generating portions described above, in the stacking direction. That is, the terminal portion where the crack is likely to occur in the surface of the reinforcement layer 70 and the stress-generating portion that generates the local stress in the reinforcement layer 70, which is likely to cause the crack in the surface of the reinforcement layer 70, are disposed so as not to overlap each other in the stacking direction. Therefore, even if an increase and decrease cycle of an inner pressure is repeated for the high-pressure tank 100, the crack in the surface of the reinforcement layer 70 can be reduced. That is, the peeling of the second hoop layer 76 at the terminal portion can be suppressed, and the buckling and the cracking of the second hoop layer 76 resulted from the peeling can be suppressed.

In the present embodiment, since pressure resistance is mainly secured by the CFRP layer 74 in the high-pressure tank 100, influence on a tank performance is practically small if the crack occurs in the surface of the second hoop layer 76. However, if the crack occurs in the surface of the high-pressure tank 100, a user may be concerned about occurrence of abnormality in the tank. Since the cracking in the second hoop layer 76 is suppressed in the present embodiment, it is possible to reduce the user's concern about the performance in relation to a change in an appearance of the tank that hardly affect the tank performance.

Additionally, the effect of suppressing the cracking in the second hoop layer 76 as described above can be particularly noticeable when the stress-generating portion is at least the second crossing portion in the second transition part where the second helical layer 78 changes to the second hoop layer 76. This is because the second crossing portion is a structure disposed between the second helical layer 78 and the second hoop layer 76 where the peeling of the second hoop layer 76 occurs, and thus the influence on the peeling of the second hoop layer 76 is especially large.

In the present embodiment, the tow prepregs are used as the carbon fiber for forming the CFRP layer (strengthening layer) 74 and the glass fiber for forming the GFRP layer (protective layer) 72. As a result, the effect of suppressing the cracking in the second hoop layer 76 is particularly noticeable. As a method for forming a fiber-reinforced plastic layer like the CFRP layer 74 and the GFRP layer 72 by a filament winding method, a wet method is known in addition to a dry method using the tow prepreg as in this embodiment. In the wet method, a fiber preliminarily impregnated with resin like the tow prepreg is not prepared. The resin is impregnated into the fiber by, for example, immersing the fiber in a resin tub storing melting resin right before winding the fiber around the work, and then the filament winding method is performed. The dry method enables high-speed filament winding; however, an amount of the resin impregnated into the fiber wound around the work is usually smaller, compared with the wet method. It is considered that as the amount of the resin impregnated into the fiber is smaller, the second hoop layer 76 is more likely to peel off when the high-pressure tank 100 expands and contracts. According to this embodiment, even if the dry method, which is more likely to cause the problem of peeling the second hoop layer 76, is adopted, the cracking in the second hoop layer 76 can be suppressed. However, the wet method may adopt the configuration in which the terminal portion of the glass fiber is disposed to overlap the second area β in the stacking direction.

In the present embodiment, the terminal portion of the glass fiber, where the second hoop layer 76 is likely to peel off, and the stress-generating portion that generates the local stress in the reinforcement layer 70, which is likely to cause the peeling of the second hoop layer 76, are disposed so as not to overlap in the stacking direction. There may be several stress-generating portions in the high-pressure tank 100, as described above. In order to more effectively reduce the cracking in the surface of the reinforcement layer 70 in the high-pressure tank 100, the number of stress-generating portions not overlapping the terminal portion in the stacking direction may be larger. Father, none of the stress-generating portions may overlap the terminal portion in the stacking direction.

In order to specify the positional relation between the terminal portion of the glass fiber and the stress-generating portions in the high-pressure tank, it is necessary to perform actions to observe cross-sections taken by cutting the high-pressure tank in a perpendicular direction relative to the axis direction on the entire high-pressure tank at sufficiently short intervals, for example. Repeatedly observing the cross-sections of the high-pressure tank, as described above, makes it possible to specify the locations of the terminal portion of the glass fiber and each of the stress-generating portions, that is, the stress-generating portions generating the local stress in the reinforcement layer such as the convex portion formed on the outer surface of the liner, the crossing portions of the carbon fiber or the glass fiber wound around the liner, and the joining portion joining the carbon fibers or the glass fibers. Alternatively, the locations of the crossing portions of the carbon fiber or the glass fiber wound around the liner and the joining portion may be specified by dry distilling the high-pressure tank so as to volatilize a resin component constituting the reinforcement layer and leave the fibers.

B. Second Embodiment

Figure 13:
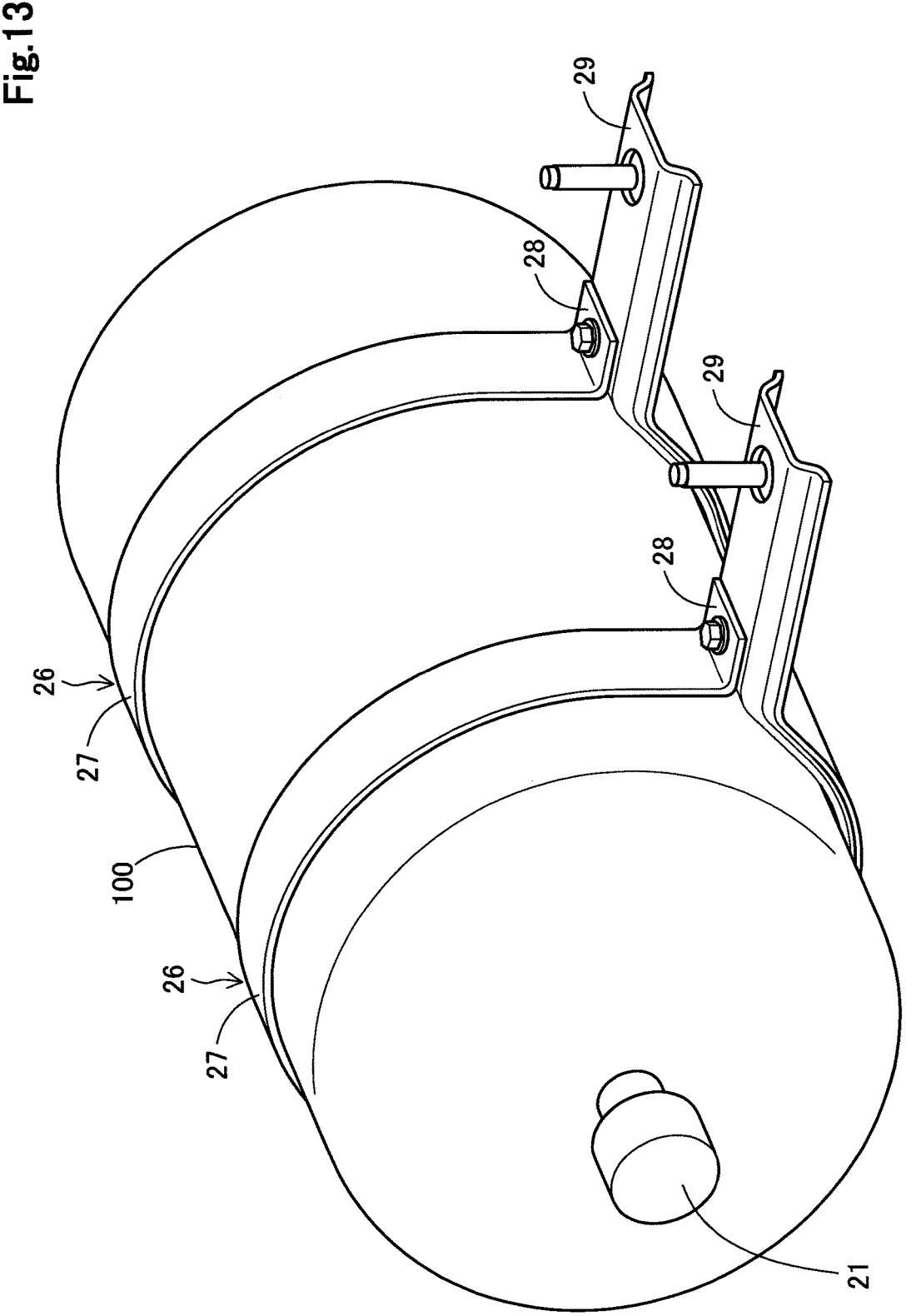
FIG. 13 is a perspective view of the high-pressure tank installed in a high-pressure tank mounting apparatus.

FIG. 13 is a perspective view of the high-pressure tank 100 in a second embodiment of the present disclosure installed in a fuel cell vehicle functioning as a high-pressure tank mounting apparatus. The high-pressure tank 100 according to the second embodiment has a configuration that is similar to that of the high-pressure tank 100 according to the first embodiment. Thus, components that are the same as those in the first embodiment are denoted with the same reference numerals and will not be elaborated upon here.

The high-pressure tank 100 is secured to structural members 29 with fixing members 26. The structural members 29 are secured to a vehicle body of the fuel cell vehicle that is not shown. As shown in FIG. 13, in the present embodiment, the fixing members 26 are formed in a belt shape, curved so as to follow the circumference of the high-pressure tank 100, and fastened to the structural members 29 by fastening portions 28 disposed on both ends. Parts of the fixing members 26 that are curved and contact with the surface of the high-pressure tank 100 are also referred to as contact portions 27. The fixing members 26 need to be strong enough to secure the high-pressure tank 100 and can be made of metal, for example. In the present embodiment, two fixing members 26 are used; however, one or more than two fixing members 26 may be used. In addition, the fixing members 26 may be in a shape other than the belt shape. The fixing members 26 need to secure the high-pressure tank 100 to the high-pressure tank mounting apparatus while making contact with the outer surface of the high-pressure tank 100 at the contact portions 27 and fastened to the structural members 29 by the fastening portions 28.

In the present embodiment, at least part of the terminal portion of the glass fiber constituting the second hoop layer 76 on the outer surface of the high-pressure tank 100 is covered with any one of the contact portions 27 of the fixing members 26.

With such a configuration, the part of the terminal portion of the glass fiber covered with the contact portion 27 is pushed by the fixing member 26 from the outside of the tank. Accordingly, at the part of the terminal portion of the glass fiber covered with the contact portion 27, the peeling of the second hoop layer 76 from the second helical layer 78 and the buckling of the second hoop layer 76 are suppressed. As a result, even if the increase and decrease cycle of the inner pressure is repeated for the high-pressure tank 100, the effect for reducing the crack in the surface of the reinforcement layer 70 can be enhanced.

C. Alternative Embodiments (C1) The stress-generating portions are not limited to the configurations described in detail in the foregoing embodiments. For example, in the forgoing embodiments, as the convex portion formed on the outer surface of the liner 10 as the stress-generating portion, the convex portion 14 formed at the liner joining portion 15 is described; however, it may be a convex portion disposed at a different portion from the liner joining portion 15. Such a configuration can exhibit the same effect as that of the forgoing embodiments described above, if the terminal portion of the glass fiber constituting the second hoop layer 76 is disposed to overlap the second area β in the stacking direction.

(C2) The high-pressure tank mounting apparatus is not limited to the fuel cell vehicle. It needs to be an apparatus equipped with a device consuming the fluid filled in the high-pressure tank. The device is, for example, a fuel cell if the fluid is hydrogen. If the high-pressure tank is secured to a structural member of a high-pressure tank mounting apparatus with the same kind of fixing member as that in the second embodiment, the effect for suppressing the crack in the surface of the reinforcement layer 70 can be enhanced as in the second embodiment.

The present disclosure is not limited to the embodiments described above, and may be implemented in various ways without departing from the scope of the present disclosure. For example, the technical features of any of the above embodiments corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential in the description hereof. For example, the present disclosure may be implemented as the following aspects.

(1) According to one aspect of the present disclosure, a high-pressure tank is provided. The high-pressure tank comprises a liner including a cylindrical portion and hemispherical dome portions on both sides of the cylindrical portion, and a reinforcement layer covering an outer surface of the liner. The reinforcement layer includes a strengthening layer that is formed on the liner and includes a first helical layer including a carbon fiber in helical winding and a first resin, and a first hoop layer including the carbon fiber in hoop winding and the first resin. The reinforcement layer includes a protective layer that is formed on the strengthening layer and includes a second helical layer including a glass fiber in the helical winding and a second resin, and a second hoop layer formed on the second helical layer and including the glass fiber in hoop winding and the second resin. The high-pressure tank further comprises a stress-generating portion generating a local stress in the reinforcement layer. The stress-generating portion is at least one of (a) a convex portion locally forming a convex shape on the outer surface of the liner, (b) a step portion where the carbon fiber or the glass fiber crosses itself at a transition part where a winding angle of the carbon fiber or the glass fiber changes in the reinforcement layer, (c) a fiber joining portion where ends of the carbon fibers, ends of the glass fibers, or ends of the carbon fiber and the glass fiber are joined together in the reinforcement layer, (d) an end crossing portion where the carbon fiber entwines and crosses the same carbon fiber or the glass fiber entwines and crosses the same glass fiber on at least one of a winding start of the carbon fiber, a winding end of the carbon fiber, and a winding start of the glass fiber, (e) a helical crossing portion where the carbon fiber cross itself in the first helical layer disposed in contact with the liner. The reinforcement layer includes a first area that overlaps the stress-generating portion in a stacking direction of the strengthening layer and the protective layer stacked one on the other and a second area that is an area except for the first area. One-round portion including a final crossing portion where the glass fiber entwines and crosses the same glass fiber at an end of winding of the glass fiber in the second hoop layer overlaps the second area in the stacking direction.

According to the high-pressure tank in this aspect, the one-round portion including the final crossing portion where the crack is likely to occur in the surface of the reinforcement layer and the stress-generating portion generating the local stress in the reinforcement layer, which is likely to cause the crack in the surface of the reinforcement layer, are disposed so as not to overlap each other in the stacking direction. As a result, even if an increase and decrease cycle of an inner pressure is repeated for the high-pressure tank, the crack in the surface of the reinforcement layer can be reduced.

(2) In the high-pressure tank in the forgoing aspect, the liner may include a plurality of liner components and a liner joining portion may be formed between adjoining liner components of the plurality of liner components. The high-pressure tank may include the convex portion formed on the outer surface of the liner as the stress-generating portion, and the convex portion may be formed at the liner joining portion. According to the high-pressure tank in this aspect, it is possible to suppress cracking in the surface of the reinforcement layer at the liner joining portion, resulted from the stress generated in the reinforcement layer by the convex portion formed on the outer surface of the liner.

(3) In the high-pressure tank in the forgoing aspect, the first helical layer may include a low-angle helical layer where a winding angle of the carbon fiber with respect to an axis direction of the high-pressure tank is 0° or higher and 40° or lower. The step portion may be formed in the high-pressure tank as the stress-generating portion. The step portion may include one or more first step portions where the carbon fiber crosses itself in a first transition part where the low-angle helical layer changes to a layer having a higher winding angle than that of the low-angle helical layer in the strengthening layer. According to the high-pressure tank in this aspect, it is possible to suppress cracking in the surface of the reinforcement layer, resulted from the stress generated in the reinforcement layer by the first step portion.

(4) In the high-pressure tank in the forgoing aspect, the step portion may be formed as the stress-generating portion. The step portion may include one or more second step portions where the glass fiber crosses itself in a second transition part where the second helical layer changes to the second hoop layer. According to the high-pressure tank in this aspect, it is possible to suppress cracking in the surface of the reinforcement layer, resulted from the stress generated in the reinforcement layer by the second step portion.

(5) In the high-pressure tank in the forgoing aspect, the fiber joining portion may be formed as the stress-generating portion. The fiber joining portion may include one or more first joining portions where ends of a plurality of the carbon fibers are joined together in the strengthening layer. According to the high-pressure tank in this aspect, it is possible to suppress cracking in the surface of the reinforcement layer, resulted from the stress generated in the reinforcement layer by the first joining portion.

(6) In the high-pressure tank in the forgoing aspect, the fiber joining portion may be formed as the stress-generating portion. The fiber joining portion may include one or more second joining portions where ends of a plurality of the glass fibers are joined together in at least one of the second helical layer and the second hoop layer. According to the high-pressure tank in this aspect, it is possible to suppress cracking in the surface of the reinforcement layer, resulted from the stress generated in the reinforcement layer by the second joining portion.

(7) In the high-pressure tank according to the forgoing aspect, a third joining portion may be formed between the strengthening layer and the second helical layer. At the third joining portion, a terminal end of the carbon fiber constituting the strengthening layer and a starting end of the glass fiber constituting the second helical layer are joined together. The high-pressure tank may include the fiber joining portion as the stress-generating portion, and the fiber joining portion may include the third joining portion. According to the high-pressure tank in this aspect, it is possible to suppress cracking in the surface of the reinforcement layer, resulted from the stress generated in the reinforcement layer by the third joining portion.

(8) In the high-pressure tank according to the forgoing aspect, between the strengthening layer and the second helical layer, the terminal end of the carbon fiber constituting the strengthening layer and the starting end of the glass fiber constituting the second helical layer may be in Non-connected state. The end crossing portion may be formed in the high-pressure tank as the stress-generating portion, and the end crossing portion may be disposed on at least one of the terminal end of the carbon fiber and the starting end of the glass fiber. According to the high-pressure tank in this aspect, it is possible to suppress cracking in the surface of the reinforcement layer, resulted from the stress generated in the reinforcement layer by at least one of the terminal end and the starting end.

(9) In the high-pressure tank in the forgoing aspect, the first helical layer may include one or more low-angle helical layers where a winding angle of the carbon fiber with respect to an axis direction of the high-pressure tank is 0° or higher and 40° or lower. The helical crossing portion may be formed in the high-pressure tank as the stress-generating portion. The helical crossing portion may be where the carbon fiber crosses itself in an inmost low-angle helical layer disposed in contact with the liner of the low-angle helical layers, and where the number of the carbon fibers overlapping in the stacking direction is the largest in the inmost low-angle helical layer. According to the high-pressure tank in this aspect, it is possible to suppress cracking in the surface of the reinforcement layer, resulted from the stress generated in the reinforcement layer by the helical crossing portion in the inmost low-angle helical layer.

(10) According to another aspect of the present disclosure, provided is a high-pressure tank mounting apparatus for mounting the high-pressure tank according to any one of (1) to (9). This high-pressure tank mounting apparatus comprises a structural member to which the high-pressure tank is secured, and a fixing member including a contact portion and a fastening portion and securing the high-pressure tank to the structural member while making contact with an outer surface of the high-pressure tank at the contact portion and being fastened to the structural member at the fastening portion. At least part of the one-round portion including the final crossing portion of the glass fiber is covered with the contact portion of the fixing member on the outer surface of the high-pressure tank. According to the high-pressure tank mounting apparatus in this aspect, effect for reducing the crack in the surface of the reinforcement layer in the high-pressure tank can be enhanced.

The present disclosure may be implemented in various aspects other than those described above. For example, it may be implemented in an aspect such as a method for manufacturing the high-pressure tank.

What is claimed is:

1. A high-pressure tank comprising:
   a liner including a cylindrical portion and hemispherical dome portions on both sides of the cylindrical portion;
   a reinforcement layer covering an outer surface of the liner;
   the reinforcement layer including
      a strengthening layer that is formed on the liner, the strengthening layer including a first helical layer including a carbon fiber in helical winding and a first resin, and a first hoop layer including the carbon fiber in hoop winding and the first resin and
      a protective layer that is formed on the strengthening layer, the protective layer including a second helical layer including a glass fiber in helical winding and a second resin, and a second hoop layer formed on the second helical layer and including the glass fiber in hoop winding and the second resin; and
   a stress-generating portion generating a local stress in the reinforcement layer,
   the stress-generating portion is at least one of (a) a convex portion locally forming a convex shape on the outer surface of the liner, (b) a step portion where the carbon fiber or the glass fiber crosses itself at a transition part where a winding angle of the carbon fiber or the glass fiber changes in the reinforcement layer, (c) a fiber joining portion where ends of the carbon fibers, ends of the glass fibers, or ends of the carbon fiber and the glass fiber are joined together in the reinforcement layer, (d) an end crossing portion where the carbon fiber entwines and crosses the same carbon fiber or the glass fiber entwines and crosses the same glass fiber, on at least one of a winding start of the carbon fiber, a winding end of the carbon fiber, and a winding start of the glass fiber, and (e) a helical crossing portion where the carbon fiber cross itself in the first helical layer disposed in contact with the liner, wherein the reinforcement layer includes a first area that overlaps the stress-generating portion in a stacking direction of the strengthening layer and the protective layer stacked one on the other, and a second area that is an area except for the first area, and wherein one-round portion including a final crossing portion where the glass fiber entwines and crosses the same glass fiber at an end of winding of the glass fiber in the second hoop layer overlaps the second area in the stacking direction.

2. The high-pressure tank according to claim 1, wherein the liner includes a plurality of liner components and a liner joining portion is formed between adjoining liner components of the plurality of liner components, the high-pressure tank includes the convex portion formed on the outer surface of the liner as the stress-generating portion, and the convex portion is formed at the liner joining portion.

3. The high-pressure tank according to claim 1, wherein the first helical layer includes a low-angle helical layer where a winding angle of the carbon fiber with respect to an axis direction of the high-pressure tank is 0° or higher and 40° or lower, the high-pressure tank includes the step portion formed as the stress-generating portion, and the step portion includes one or more first step portions where the carbon fiber crosses itself in a first transition part where the low-angle helical layer changes to a layer having a higher winding angle than that of the low-angle helical layer in the strengthening layer.

4. The high-pressure tank according to claim 1, wherein the high-pressure tank includes the step portion formed as the stress-generating portion, and the step portion includes one or more second step portions where the glass fiber crosses itself in a second transition part where the second helical layer changes to the second hoop layer.

5. The high-pressure tank according to claim 1, wherein the high-pressure tank includes the fiber joining portion formed as the stress-generating portion, and the fiber joining portion includes one or more first joining portions where ends of a plurality of the carbon fibers are joined together in the strengthening layer.

6. The high-pressure tank according to claim 1, wherein the high-pressure tank includes the fiber joining portion formed as the stress-generating portion, and the fiber joining portion includes one or more second joining portions where ends of a plurality of the glass fibers are joined together in at least one of the second helical layer and the second hoop layer.

7. The high-pressure tank according to claim 1, wherein a third joining portion is formed between the strengthening layer and the second helical layer, the third joining portion is a portion where a terminal end of the carbon fiber constituting the strengthening layer and a starting end of the glass fiber constituting the second helical layer are joined together, the high-pressure tank includes the fiber joining portion formed as the stress-generating portion, and the fiber joining portion includes the third joining portion.

8. The high-pressure tank according to claim 1, wherein between the strengthening layer and the second helical layer, a terminal end of the carbon fiber constituting the strengthening layer and a starting end of the glass fiber constituting the second helical layer are in Non-connected state, the high-pressure tank includes the end crossing portion formed as the stress-generating portion, and the end crossing portion is disposed on at least one of the terminal end of the carbon fiber and the starting end of the glass fiber.

9. The high-pressure tank according to claim 1, wherein the first helical layer includes one or more low-angle helical layers where a winding angle of the carbon fiber with respect to an axis direction of the high-pressure tank is 0° or higher and 40° or lower, the high-pressure tank includes the helical crossing portion formed as the stress-generating portion, and the helical crossing portion is where the carbon fiber crosses itself in an inmost low-angle helical layer disposed in contact with the liner of the low-angle helical layers, and where number of carbon fibers overlapping in the stacking direction is the largest in the inmost low-angle helical layer.

\* \* \* \* \*